US012751579B2

(12) United States Patent
Beckstrom

(10) Patent No.: US 12,751,579 B2
(45) Date of Patent: Oct. 6, 2026

(54) COVER AND MOTOR MOUNT FOR FOOD BLENDER SOUND ENCLOSURE

(71) Applicant: CONAIR LLC, Stamford, CT (US)

(72) Inventor: David William Beckstrom, Roxbury, CT (US)

(73) Assignee: CONAIR LLC, Stamford, CT (US)

( * ) Notice: Subject to any disclaimer, the term of this patent is extended or adjusted under 35 U.S.C. 154(b) by 765 days.

(21) Appl. No.: 18/113,318

(22) Filed: Feb. 23, 2023

(65) Prior Publication Data

US 2024/0285128 A1 Aug. 29, 2024

(51) Int. Cl.
*A47J 43/00* (2006.01)
*A47J 43/046* (2006.01)
*A47J 43/07* (2006.01)

(52) U.S. Cl.
CPC ......... *A47J 43/0772* (2013.01); *A47J 43/046* (2013.01)

(58) Field of Classification Search
CPC ....... A47J 43/0772; A47J 43/046; A47J 43/07
See application file for complete search history.

(56) References Cited

U.S. PATENT DOCUMENTS

| | | | |
|---|---|---|---|
| 2,930,596 | A | 3/1960 | Waters |
| 3,250,518 | A | 5/1966 | Van Rossem |
| 3,415,497 | A | 12/1968 | Johnson |
| RE27,002 | E | 12/1970 | Stephan et al. |
| 4,100,613 | A | 7/1978 | Shaeffer |
| D309,077 | S | 7/1990 | Pomroy |
| D318,398 | S | 7/1991 | Disco |
| 5,289,953 | A | 3/1994 | McMillan |
| 5,383,613 | A | 1/1995 | Sundquist |
| 5,533,797 | A | 7/1996 | Gelber |
| 5,957,577 | A | 9/1999 | Dickson et al. |
| D424,865 | S | 5/2000 | Crescenzi et al. |
| D428,302 | S | 7/2000 | Miller |
| D432,864 | S | 10/2000 | Kindig et al. |
| D466,760 | S | 12/2002 | Baerenrodt |
| D466,761 | S | 12/2002 | Baerenrodt |

(Continued)

FOREIGN PATENT DOCUMENTS

| | | |
|---|---|---|
| CN | 103720354 | 4/2014 |
| CN | 107334393 | 11/2017 |

(Continued)

OTHER PUBLICATIONS

Yang, CN209172094U Machine Translation (Year: 2019).*

(Continued)

*Primary Examiner* — Anshu Bhatia
(74) *Attorney, Agent, or Firm* — Grogan, Tuccillo & Vanderleeden, LLP

(57) ABSTRACT

A food processing system includes a processing container having a motor-driven processing blade positioned at a bottom of the processing container, a lid receivable atop the processing container, a motor-driven dasher assembly connected to the lid and being configured to scrape interior sidewalls of the processing container, the motor-driven dasher assembly having a hub, and a motor having an output shaft. The output shaft is moveable between a raised position where the output shaft is vertically spaced from the hub of the motor-driven dasher assembly, and a lowered position where the output shaft is engaged with the hub.

17 Claims, 14 Drawing Sheets

(56) References Cited

U.S. PATENT DOCUMENTS

| | | | |
|---|---|---|---|
| 6,533,140 | B1 | 3/2003 | Freeman |
| 6,571,908 | B2 | 6/2003 | Bohannon et al. |
| D528,363 | S | 9/2006 | Ulanski |
| D528,364 | S | 9/2006 | Kolar et al. |
| D550,506 | S | 9/2007 | Spitzer |
| D553,418 | S | 10/2007 | Sartore et al. |
| D553,433 | S | 10/2007 | Picozza et al. |
| 7,350,963 | B2 | 4/2008 | Williams et al. |
| D568,088 | S | 5/2008 | Maxwell |
| D587,526 | S | 3/2009 | Barnard et al. |
| D588,406 | S | 3/2009 | Ulanski |
| D621,656 | S | 8/2010 | Ulanski et al. |
| D635,823 | S | 4/2011 | Mauffette |
| D637,862 | S | 5/2011 | Foquet |
| 8,087,603 | B2 | 1/2012 | Kolar et al. |
| D661,548 | S | 6/2012 | Brinckerhoff et al. |
| D669,741 | S | 10/2012 | Shaw |
| 8,287,180 | B2 | 10/2012 | Kolar et al. |
| D734,673 | S | 7/2015 | Brin |
| 9,095,238 | B2 | 8/2015 | Lee |
| D770,238 | S | 11/2016 | Lundwell |
| D787,882 | S | 5/2017 | McConnell et al. |
| 9,681,778 | B2 | 6/2017 | Pendleton et al. |
| D798,109 | S | 9/2017 | Ulanski et al. |
| 9,770,133 | B2 | 9/2017 | Dickson, Jr. et al. |
| D808,718 | S | 1/2018 | Coakley |
| D811,167 | S | 2/2018 | Smith |
| 9,901,215 | B2 | 2/2018 | Rosenzweig |
| D817,110 | S | 5/2018 | Kellow, Jr. |
| 9,981,234 | B2 | 5/2018 | Fleming |
| D838,538 | S | 1/2019 | Carlson |
| 10,357,131 | B2 | 7/2019 | Dickson, Jr. et al. |
| 10,357,749 | B2 | 7/2019 | Fleming |
| D883,021 | S | 5/2020 | McConnell et al. |
| 10,638,884 | B2 | 5/2020 | Zakowski et al. |
| D900,172 | S | 10/2020 | Wu et al. |
| D900,548 | S | 11/2020 | Lee |
| D905,504 | S | 12/2020 | Upston |
| D922,144 | S | 6/2021 | McConnell et al. |
| D923,405 | S | 6/2021 | Kettavong et al. |
| D945,825 | S | 3/2022 | Beckstrom |
| D977,910 | S | 2/2023 | Beckstrom |
| 2003/0034200 | A1 | 2/2003 | Bohannon et al. |
| 2006/0261066 | A1 | 11/2006 | Boozer et al. |
| 2007/0165484 | A1 | 7/2007 | Branson, III et al. |
| 2010/0038462 | A1 | 2/2010 | Kolar et al. |
| 2014/0286123 | A1 | 9/2014 | Arnett et al. |
| 2014/0299701 | A1 | 10/2014 | Zakowski |
| 2017/0209000 | A1 | 7/2017 | Dickson, Jr. et al. |
| 2017/0224169 | A1 | 8/2017 | Kolar |
| 2019/0380537 | A1* | 12/2019 | Kim .................... A47J 43/0716 |
| 2020/0275807 | A1 | 9/2020 | Kolar et al. |
| 2020/0375402 | A1 | 12/2020 | Krivos et al. |
| 2022/0142409 | A1 | 5/2022 | Beckstrom |
| 2022/0142410 | A1 | 5/2022 | Beckstrom |
| 2023/0148799 | A1* | 5/2023 | Roberts ............... A47J 43/0722 366/292 |

FOREIGN PATENT DOCUMENTS

| | | | |
|---|---|---|---|
| CN | 209074344 | 7/2019 | |
| CN | 209172094 U * | 7/2019 | |
| CN | 305863223 | 6/2020 | |
| CN | 211324546 | 8/2020 | |
| CN | 111728506 | 10/2020 | |
| EP | 1430824 | 6/2004 | |
| EP | 3311717 | 4/2018 | |
| GB | 2465834 | 6/2010 | |
| KR | 100614150 | 8/2006 | |
| WO | D101251-019 | 1/2018 | |
| WO | WO-2018078265 A1 * | 5/2018 | ............ A47J 27/004 |

OTHER PUBLICATIONS

Smit, WO2018078265 Machine Translation (Year: 2018).*

Blendtec Commercial Connoisseur 825 Blender—With Two FourSide Jars & Soft Lids; https://www.amazon.com/Blendtec-Commercial-CONNOISSEUR-825-Blender/dp/B079TH7XXD/ref.

Vitamix E310 Explorian Blender, Professional-Grade, 48 oz. Container, Black; https://www.amazon.com/Vitamix-E310-Explorian-Professional-Grade-Container/dp/B07GC9XZ9W?th=1.

* cited by examiner

COVER AND MOTOR MOUNT FOR FOOD BLENDER SOUND ENCLOSURE

FIELD OF THE INVENTION

The present invention relates generally to food processing devices and, more particularly, to a cover and motor mount for a food blender sound enclosure.

BACKGROUND OF THE INVENTION

Food processing devices providing a number of different types of food processing operations such as blending, mixing, grinding, chopping, slicing, grating, shredding, and the like, are well known. Existing food processing devices typically include a base housing an electric motor, a drive shaft driven by the motor, a blending or processing jar receivable on the base and a lid or cover releasably mounted to the jar. A rotatably driven blade is mounted in the bottom of the jar and is engageable with the drive shaft so as to be driven by the motor to process one or more food items inside the jar.

Certain existing food processing devices, such as that disclosed in U.S. Patent Application Publication No. 2022/0142410, which is incorporated by reference herein in its entirety, also employ a motorized dasher or scraper integrated with the lid, which is operable to scrape foodstuffs from the sides of the blending jar during processing, without necessitating cessation of the processing operation or removal of the blender jar lid. Such a scraper or dasher is particularly useful when processing thicker products, such as nut butters, hummus, shakes, smoothies, and the like.

A common occurrence with electric food processors or blenders, of the type described above, is the noise generated when the food processor is running. The amount of noise generated by these devices is a result of both the blending taking place within the container of the blender, often involving the crushing of ice or other hard food items, as well as the noise vibrations that are generated by the electric motor of the food processor. The noise levels generated by the food processor are particularly troublesome in commercial settings such as restaurants, food stands, and coffee shops, especially where the food processor is positioned near a customer service counter.

Enclosures are thus often provided for food processors to isolate the container and reduce the noise levels during operation. Such enclosures are known in the art such as that shown, for example, in U.S. Patent Application Publication No. 2022/0142410. These enclosures are designed to muffle or dampen the noise of the food processor during operation. Most enclosures are formed of two components, that is, a rear enclosure member and a front enclosure member. The front enclosure member is usually hingedly attached to the rear enclosure member which is attached to the base of the food processing device. The rear enclosure member may secured to the base by a number of methods known in the art, such as, for example, by tongue and groove attachment, mechanical fasteners, or by magnetic means. When the blender jar of the food processor is positioned on the base, it may be accessed by pivoting the front enclosure member relative to the rear enclosure member.

While existing food processing devices of the type described above are generally suitable for what may be regarded as ordinary performance and operation, there is a need for improvement in terms of overall easy of operability. In particular, there is a need for a food processing device and a cover and motor mount for the same, which is easy to use and which establishes a reliable connection between a dasher motor and a dasher assembly of the blender jar upon closure of a sound enclosure of the food processing device.

SUMMARY OF THE INVENTION

It is an object of the present invention to provide a food processing system.

It is another object of the present invention to provide a food processing system having a sound enclosure for reducing noise levels created by operation of the system.

It is another object of the present invention to provide a food processing system having a motor driven dasher or scraper assembly for removing foodstuffs from the sidewalls of a blender jar during operation.

It is another object of the present invention to provide a food processing system having a motor driven dasher assembly that is operable even when a sound enclosure encloses the blender jar.

It is another object of the present invention to provide a food processing system having a motor of a dasher assembly that is operatively connected to a sound enclosure of the food processing system.

It is another objected of the present invention to provide a food processing system whereby a motor of a dasher assembly is moveable with a sound enclosure between engaged and disengaged positions with respect to a dasher blade.

These and other objects are achieved by the present invention.

According to an embodiment of the invention, a food processing system includes a processing container having a motor-driven processing blade positioned at a bottom of the processing container, a lid receivable atop the processing container, a motor-driven dasher assembly connected to the lid and being configured to scrape interior sidewalls of the processing container, the motor-driven dasher assembly having a hub, and a motor having an output shaft. The output shaft is moveable between a raised position where the output shaft is vertically spaced from the hub of the motor-driven dasher assembly, and a lowered position where the output shaft is engaged with the hub.

According to another embodiment of the invention, a method for food processing includes the steps of coupling a dasher assembly to a processing container such that a scraper blade of the dasher assembly is disposed within the processing container, positioning the processing container on a base of a food processor so as to engage a blade hub of the processing container with a rotatable output shaft of a motor housed in the base, lowering a dasher motor to drivingly connect an output shaft of the dasher motor with a drive hub of the dasher assembly, and actuating the dasher motor to rotate the scraper blade within the processing container.

According to yet another embodiment of the invention, a food processing system includes a base having a motor, a processing container having a motor-driven processing blade positioned at a bottom of the processing container and engageable with an output shaft of the motor in the base, a lid receivable atop the processing container, a dasher assembly connected to the lid and having at least one scraper blade disposed in the processing container and being configured to scrape interior sidewalls of the processing container, and a dasher motor positioned above the processing container, the dasher motor having an output shaft that is selectively engageable with the dasher assembly, the dasher motor being configured to rotate the at least one scraper blade upon actuation of the dasher motor. The output shaft of the dasher motor is moveable between a raised position where the output shaft is vertically spaced from the dasher assembly, and a lowered position where the output shaft is engaged with the dasher assembly.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
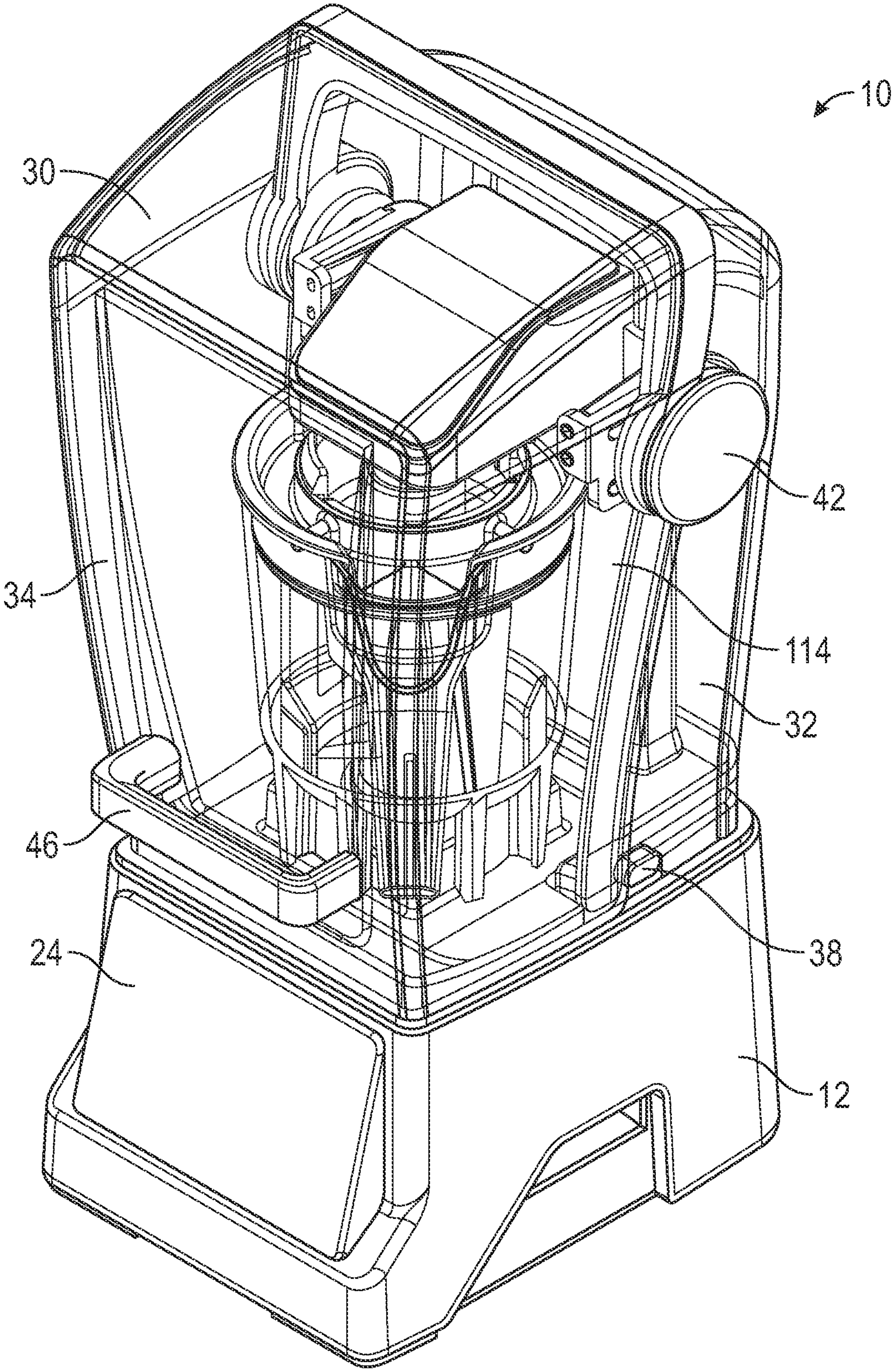
FIG. 1 is a perspective view of a food processing system according to an embodiment of the present invention, showing a sound enclosure in a closed position.
Figure 2:
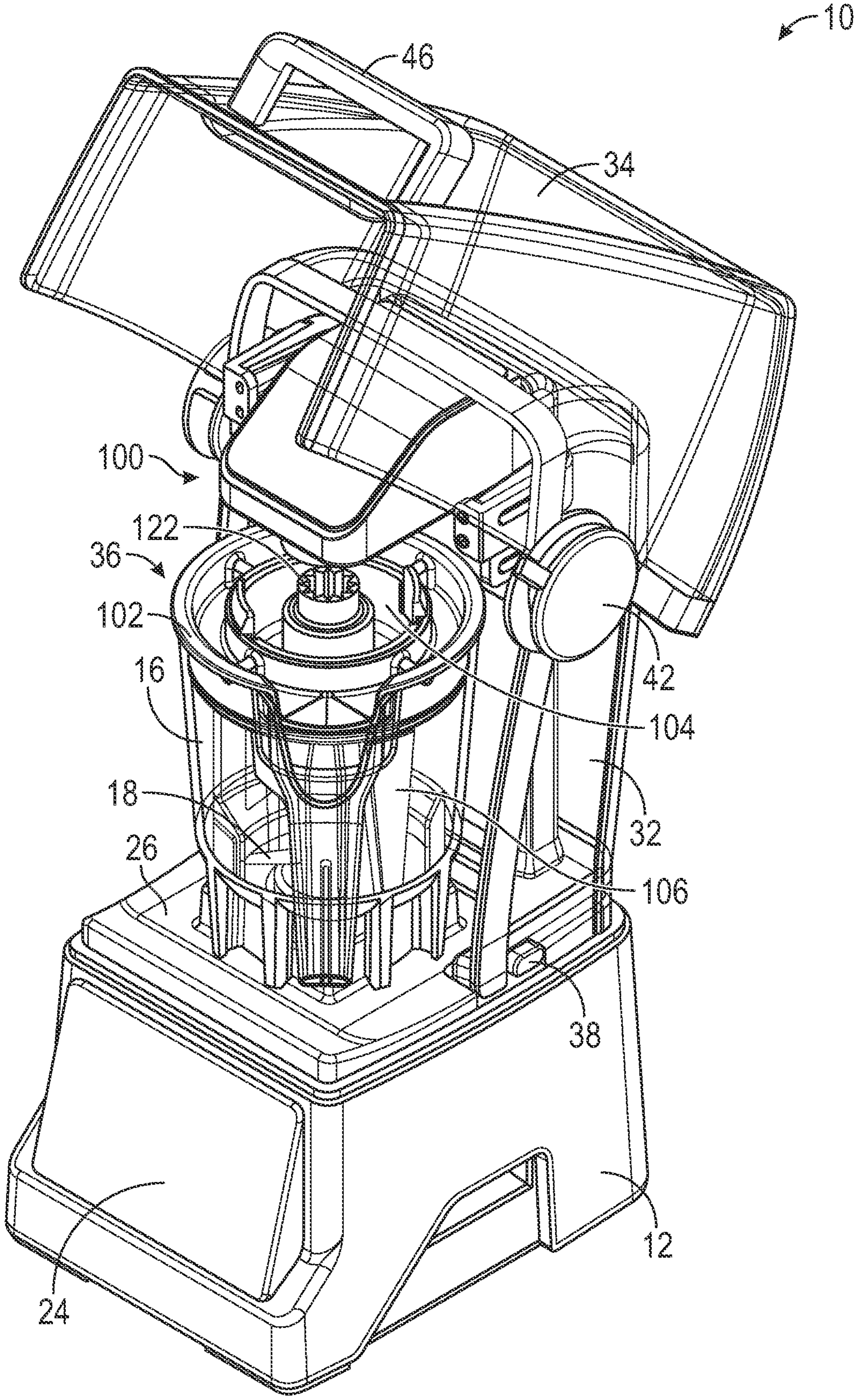
FIG. 2 is a perspective view of the food processing system of FIG. 2, showing the sound enclosure in an open position.

With reference to FIGS. 1 and 2, a food processing system 10 (also referred to herein as food processing device 10) according to an embodiment of the present invention is illustrated. As shown therein, the food processing device 10 includes a base 12 which houses a motor (not shown) drivingly connected a rotatable output shaft (not shown), as is known in the art. The food processing device 10 further includes a processing container 16 having a set of rotating blades 18 interior to the processing container 16. The processing container 16 is receivable atop the base 12 such that a splined hub of the processing container 16 (connected to the blades 18) matingly engages a correspondingly splined end of the rotatable output shaft, such that the blades 18 can be rotatably driven by the motor via the output shaft, as is known in the art. The motor may be powered by a connected electrical cord for connection to a standard outlet, however, an internal power supply (e.g., battery) may also be utilized to power the motor.

Base 12 includes a control interface 24 on one of its surfaces allowing for user control of processing operations. In particular, the control interface 24 can be utilized to turn on and off the food processing device 10, to adjust the speed of rotation of the motor, as well as control other operations of the food processing device 10 via a controller (not shown) contained within the base 12. Base 12 also includes a raised pedestal 26 on a top surface thereof, which is configured to be received in a lower portion of the processing container 16 when the processing container is placed atop the base and engaged with the output shaft of the motor. Pedestal 26 may include one or more pads which, when received by the base portion of the container 16, prevent the container 16 from rotating when the motor within base 12 is actuated. In addition, pedestal 26 also receives the splined end of the rotating motor shaft therethrough.

As best shown in FIGS. 1 and 2, the food processing device 10 further includes a sound enclosure 30 attached to the base 12. The sound enclosure 30 includes a rear enclosure member 32 forming a first half of a housing, and a front enclosure member 34 forming a second half of a housing, which together define an interior space 36 therebetween for accommodating the container 16. The rear enclosure member 32 is removably connected to the base 12 via a pair of projections 38 on the base 12 that are received in corresponding recesses or apertures adjacent to the bottom edge of the rear enclosure member 32. In an embodiment, the projections extend through the pedestal 26. Importantly, the pedestal 26 is formed from a resilient or elastomeric material such as rubber. The pedestal 26 serves as a vibration dampening mechanism to reduce the vibrations transferred from base 12 to enclosure 30, reducing the noise created by the food processing device 10 during operation. Other attachment mechanisms for attaching the rear enclosure member 34 to the base 12, such as a tongue and groove attachment, fasteners including thumb screws, magnetic means, and the like may also be utilized without departing from the broader aspects of the invention. In addition, it is contemplated that the rear enclosure member 32 may be fixedly (i.e., not removably) attached to the base 12.

The front enclosure member 34 is pivotally connected to the rear enclosure member 32 at a pair of opposed pivot points 42, as discussed in more detail, below. The front enclosure member 34 also includes a handle 46 located adjacent to a bottom edge of the front enclosure member 34 for rotating the front enclosure member 34 between a closed position, shown in FIG. 1, and an open position, shown in FIG. 2 (providing access to the interior space 36 for insertion and removal of the container 16 from the base 12). The front enclosure member 34, however, may be pivotally connected to the rear enclosure member 32 by any means known in the art, such that it can be moved from a closed position to an open position, allowing access to the interior space 36 of enclosure 30 for insertion and/or removal of the container 16.

It is contemplated that the enclosure 30 may be made of any material known in the art, however, it is preferred that the rear enclosure member 32 and front enclosure member 34 are may of a transparent or translucent material such as, for example, thermoplastic or polycarbonate, so that the container 16 can be viewed when positioned on the base 12 with the front enclosure member 34 in the closed position.

With further references FIGS. 1 and 2, the food processing device 10 additionally includes a motor-driven dasher or scraper assembly 100 that is operable to scrape food from the interior sidewalls of the container 16 during processing. The motor-driven dasher assembly 100 includes a lid 102 configured to be received atop the processing container 16, and a scraper device or dasher 104 operatively connected to the lid 102. The dasher 104 includes one or more scraper blades 106 that extend into the processing container 16 for scraping the interior sidewalls of the container 16, and a centrally located, splined hub 122 that is configured to matingly receive the splined output shaft of a dasher motor, as described in detail below. In an embodiment, the dasher 104 is configured generally similar to the dasher disclosed in U.S. Patent Application Publication No. 2022/0142410.

Figure 3:
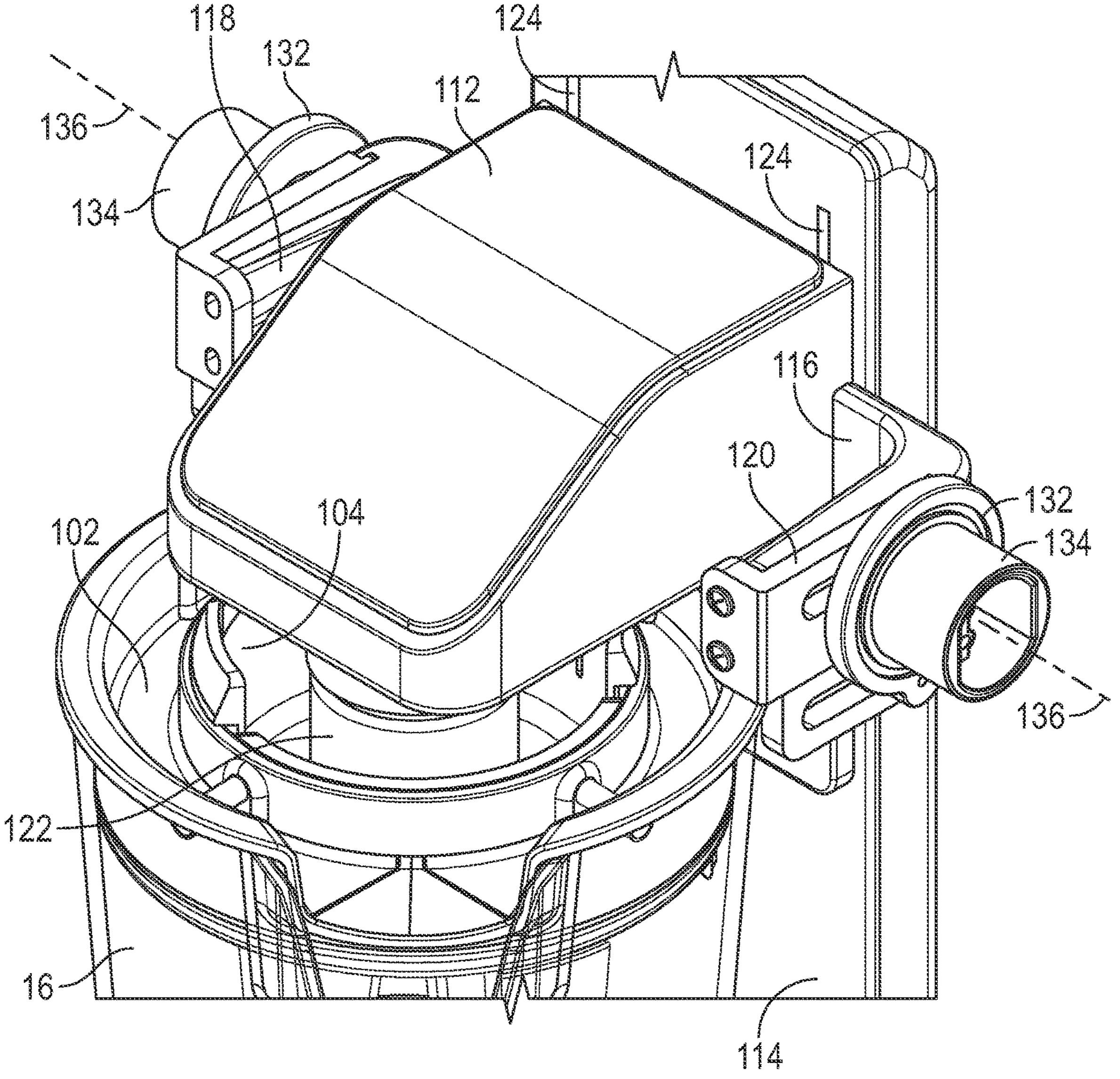
FIG. 3 is an enlarged, perspective view of a motor mount of the food processing system of FIG. 1.
Figure 4:
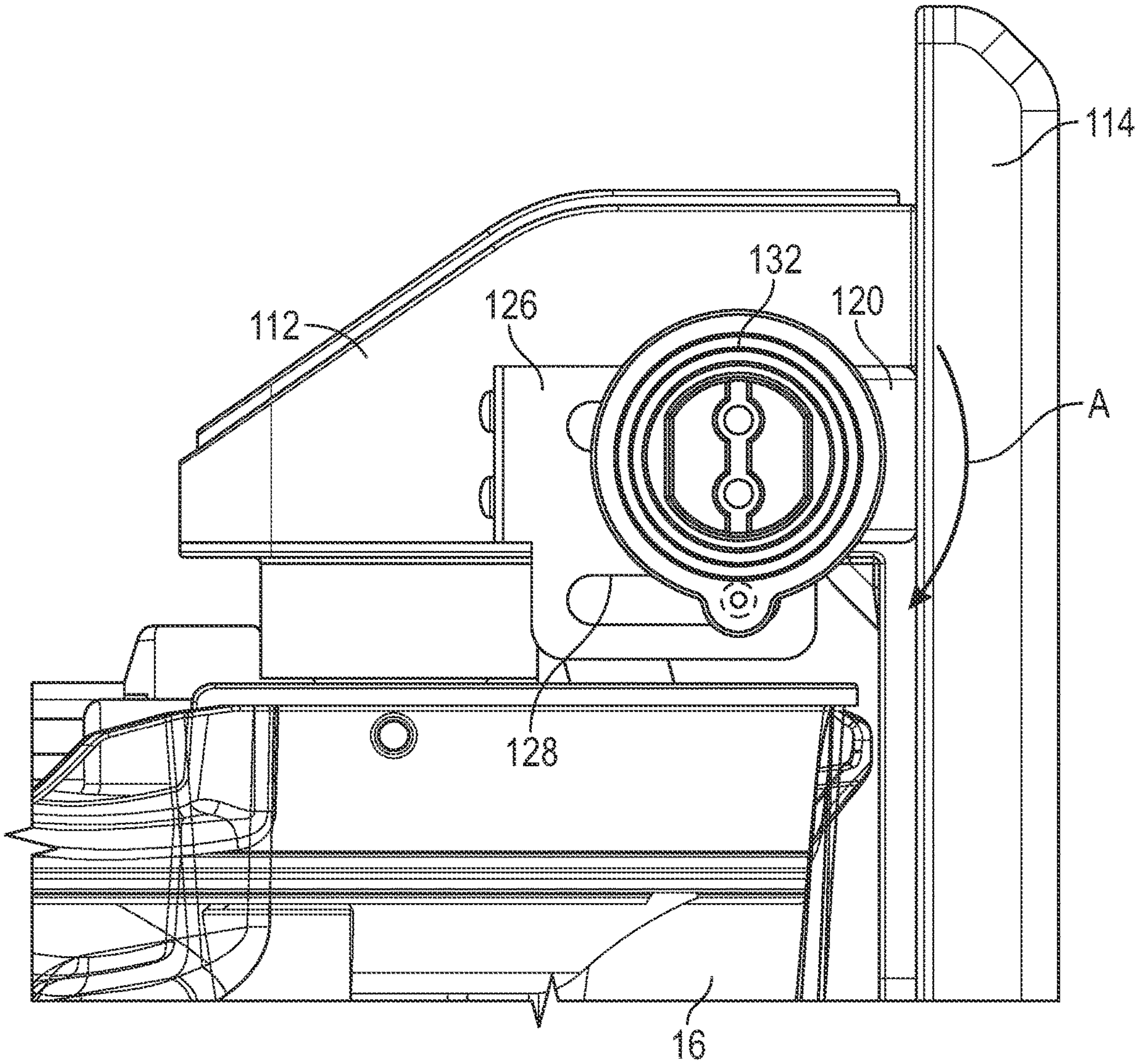
FIG. 4 is a side elevational view of the motor mount of the food processing system of FIG. 1, showing a lowered position of the motor.
Figure 5:
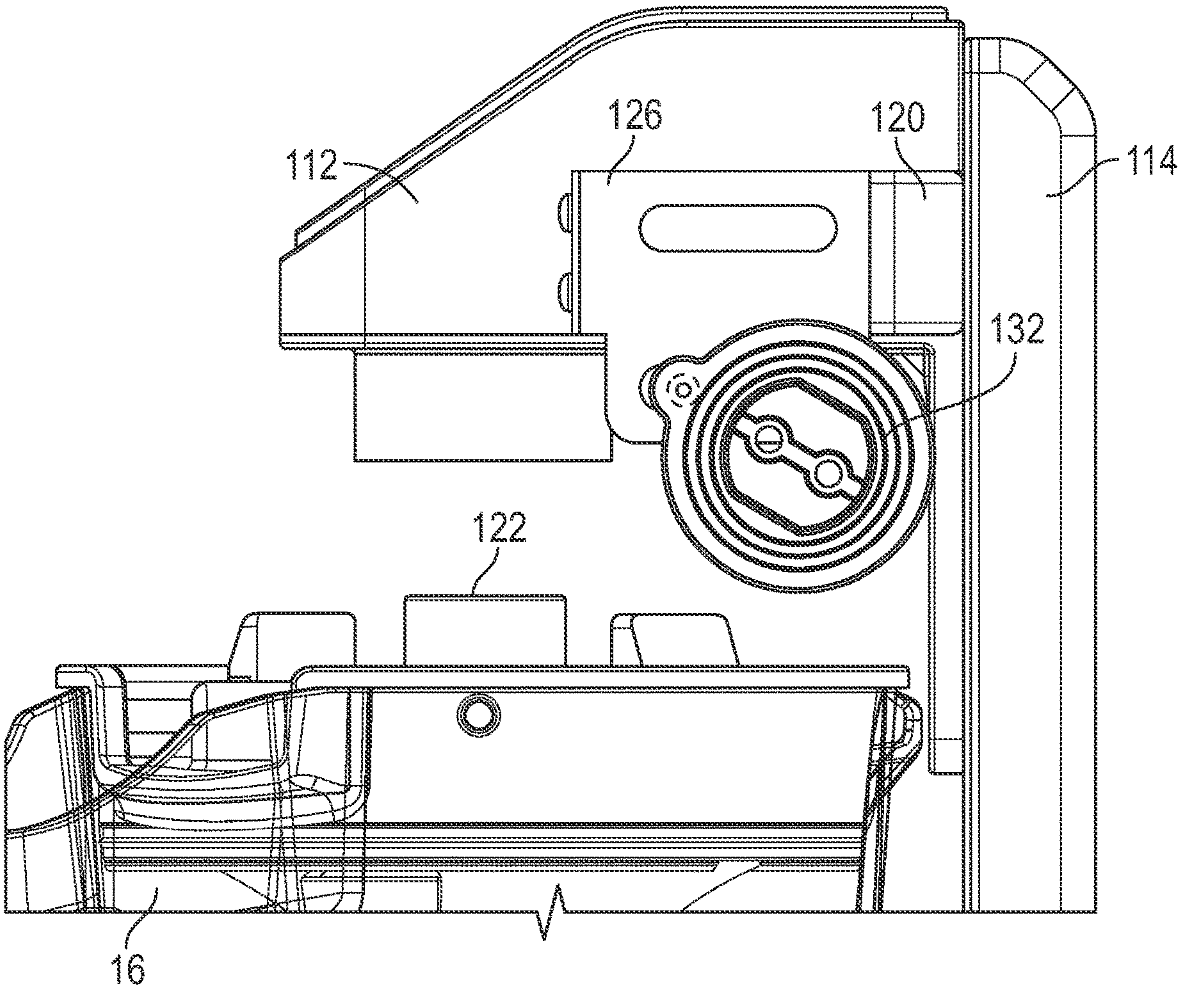
FIG. 5 is a side elevational view of the motor mount of the food processing system of FIG. 1, showing a raised position of the motor.

As indicated above, and with reference to FIGS. 3-10, the dasher assembly 100 further includes a motor 108 having a splined output shaft 110, which is configured to interface with the splined hub 122 of the dasher 104 for rotating the scraper blades 106 of the dasher 104. In an embodiment, the motor 108 is contained within a housing 112. As best shown in FIGS. 3-5, the motor 108 and motor housing 112 are supported generally above the processing container 16 by a vertical support member 114 that is attached to the base 12 of the food processing device 10. In an embodiment, a generally U-shaped mounting bracket 116 having a pair of opposed arms 118, 120 connects the motor housing 112 to the vertical support member 114. In this respect, the motor 108 and splined output shaft 110 thereof are cantilevered over the splined hub 122 of the dasher assembly 104 of the processing container 16.

In an embodiment, the motor 108 is moveable between a raised position (shown in FIG. 5) in which the output shaft 110 of the motor 108 is positioned above the hub 122 of the dasher 104 and out of engagement therewith, and a lowered position (shown in FIG. 4) in which the output shaft 110 engages the hub 122 of the dasher 104 so that rotational movement of the output shaft 110 can effect a corresponding rotation of the hub 122 and scraper blades 106 within the processing container 16.

To effect movement of the motor between the raised and lowered positions, the bracket 116 is slidably connected to the support member 114 and is moveable vertically along the support member 114 (e.g., along slots 124 in the support member 114). In an embodiment, the motor housing 112 (via the bracket 116) is operatively connected to the sound enclosure 30 in such a manner that rotating the front enclosure member 34 of the sound enclosure 30 to the closed position effects movement of the motor housing 112 to the lowered position where the output shaft 110 engages the hub 122 of the dasher 104, and moving the front enclosure member 34 of the sound enclosure 30 to the open position effects movement of the motor housing 112 to the raised position where the output shaft 110 is out of engagement with the hub 122 of the dasher 104 so that the processing container 16 can be removed from the enclosure 30 and the base 12 of the food processing device 10. In particular, the food processing device 10 is configured so that the dasher motor 108 moves up and down (and out of or into engagement with the drive hub 122 of the dasher 104) in response to opening and closing the sound enclosure 30.

To enable this functionality, the opposed arms 118, 120 of the bracket 116 each include a mounting bracket 126 connected thereto. The mounting brackets 126 each have an oblong slot 128, extending horizontally and extending generally perpendicularly to the vertical support member 114 (and parallel to arms 118, 120). While FIGS. 3-10 illustrate the mounting brackets 126 as being a separate component attached to the arms 118, 120, it is contemplated that the mounting brackets 126 may be integrally formed with the arms 118, 120 such that the arms, themselves, contain the oblong slot 128. In either case, each slot 128 is configured to receive and support therein a pin or lug 130 of a lift driver 132. Each lift driver 132 has a cylindrical projection 134 that extends laterally outward opposite the pin 130, the purpose of which will be described hereinafter. In an embodiment, the pin 130 may be configured as a cylindrical roller bearing. As illustrated in FIGS. 4-7, the pin 130 is offset from a central, rotational axis 136 of the lift driver 132 (i.e., an axis extending through the cylindrical projection 134).

As best shown in FIGS. 1 and 2, the cylindrical projection 134 of the respective lift drivers 132 is rigidly connected to opposed sides of the front enclosure member 34, and are configured to rotate with the front enclosure member 34 about the pivot points 42. In particular, the lift drivers 132 are positioned such that the central, rotational axis of each lift driver 132 is coaxial with an axis extending through the pivot points 42. Accordingly, each lift driver 132 is configured to rotate, along with the front enclosure member 34, about the axis connecting the pivot points 42 (while the rear enclosure member 32 remains stationary).

Figure 6:
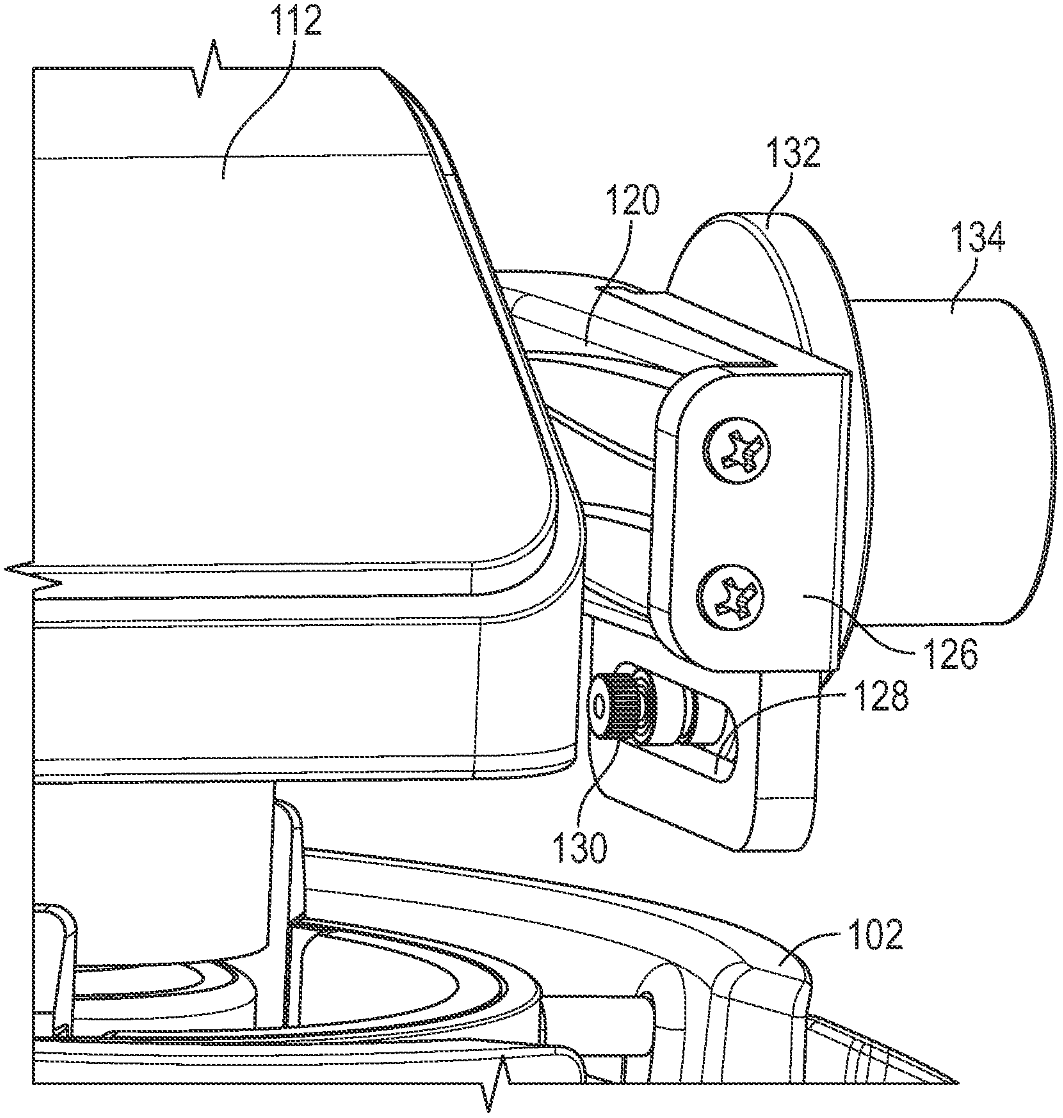
FIG. 6 is an enlarged, perspective view of the motor mount of the food processing system of FIG. 1

With reference to FIGS. 4 and 6, when the front enclosure member 34 is in the closed position, the lift drivers 132 are rotated such that the pin 130 is seated within the slot 128 adjacent to a rear of the slot 128. As illustrated therein, in this position, the motor 108 and motor housing 112 are in the lowered position in which the output shaft 110 of the motor 108 engages the hub 122 of the dasher 104. The motor 108 can then be operated to rotate the scraper blades 106 within the processing container.

Figure 7:
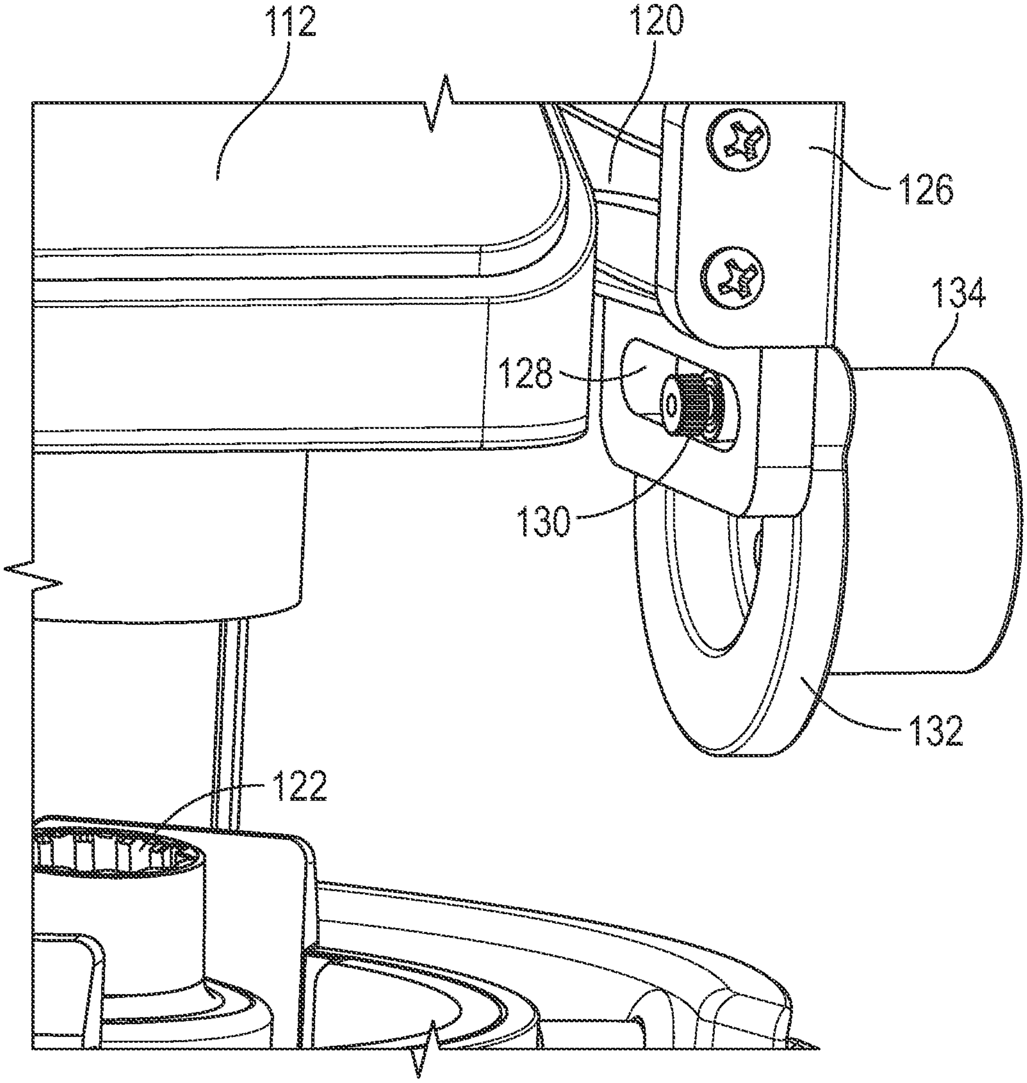
FIG. 7 is another enlarged, perspective view of the motor mount of the food processing system of FIG. 1.
Figure 8:
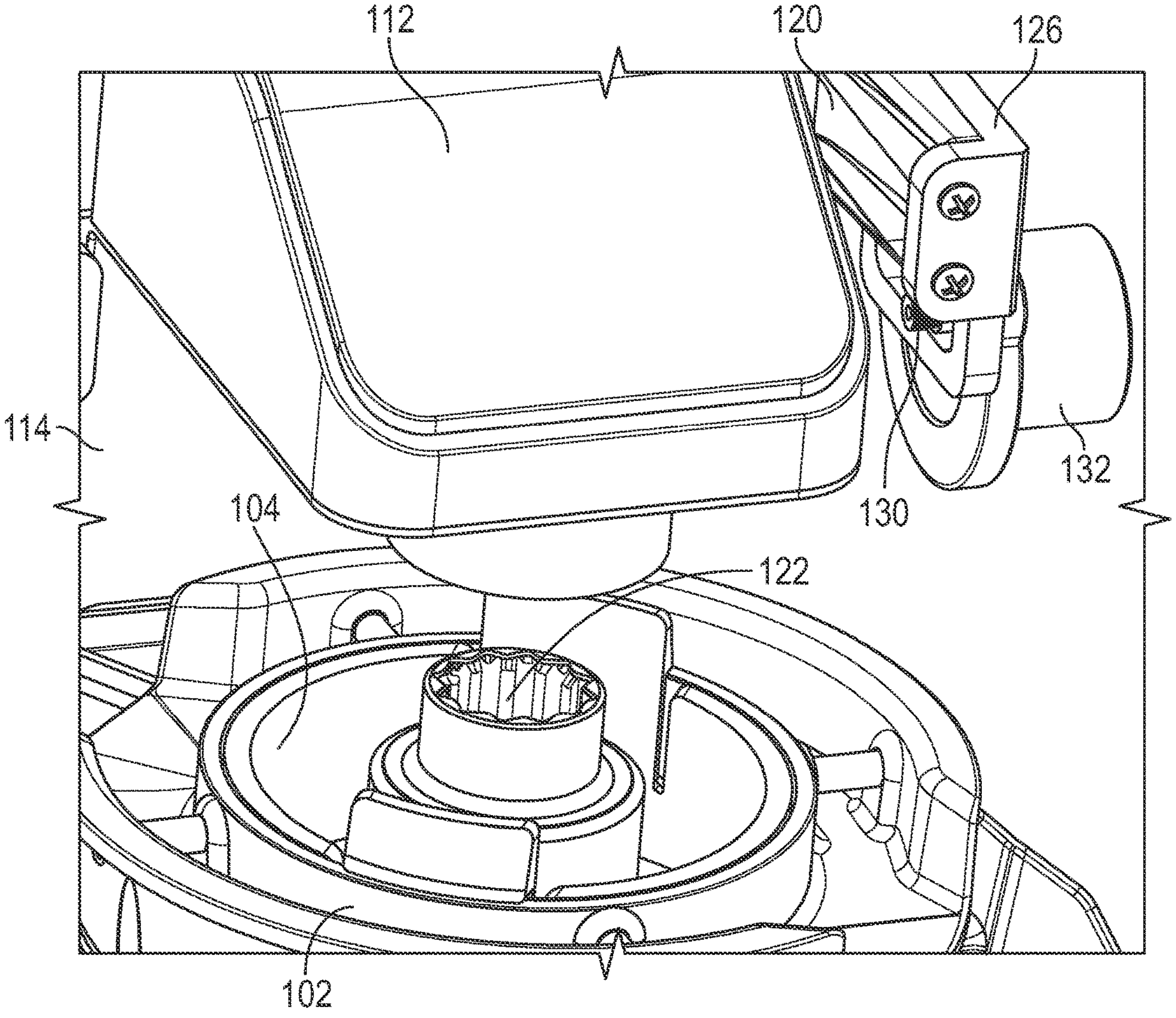
FIG. 8 is another enlarged, perspective view of the motor mount of the food processing system of FIG. 1.

Turning now to FIGS. 5 and 7, when the front enclosure member 34 is opened by lifting up on the handle 46, the front enclosure member 34 rotates relative to the rear enclosure member 32 about the axis 136 extending through the pivot points 42. This movement also causes a corresponding rotation of the lift drivers 132 about this same axis 136, in the direction of arrow, A, shown in FIG. 4. As the lift drivers 132 rotate, the offset pins/roller bearings 130 revolver or move circumferentially around axis 136 in the direction of arrow, A, until they contact the upper wall of the slots 128. Further lifting of the handle 46 effects further rotation of the lift drivers 132, causing the pins 130 to exert a generally upward lifting force on the mounting brackets 126 and opposed arms 118, 120, and to move forwardly within the slots 128. The oblong slots 128 thus allow for movement of the pins 130 along the slots 128 as the pins 130 are moved along an arc having axis 136 as its center. This lifting force causes the motor 108 and motor housing 112 to move upwardly along the vertical support member 114 to the position shown in FIGS. 5 and 7, where the output shaft 110 is out of engagement with the hub 122 of the dasher 104. In this position, the processing container 16 can be removed from the base 12.

Similarly, rotation of the front enclosure member 34 to the closed position rotates the lift drivers 132 in the opposite direction, causing the pins 130 to move in the opposite circumferential direction whereby they exert a downward force on the lower surface of the slots 128 and move rearwardly within the slots 128. This movement and force causes the motor 108 and motor housing 112 to move downwardly along the vertical support member 114 to the position shown in FIGS. 4 and 6, where the output shaft 110 is again in engagement with the hub 122 of the dasher 104 and the sound enclosure 30 is in the closed position.

Figure 9:
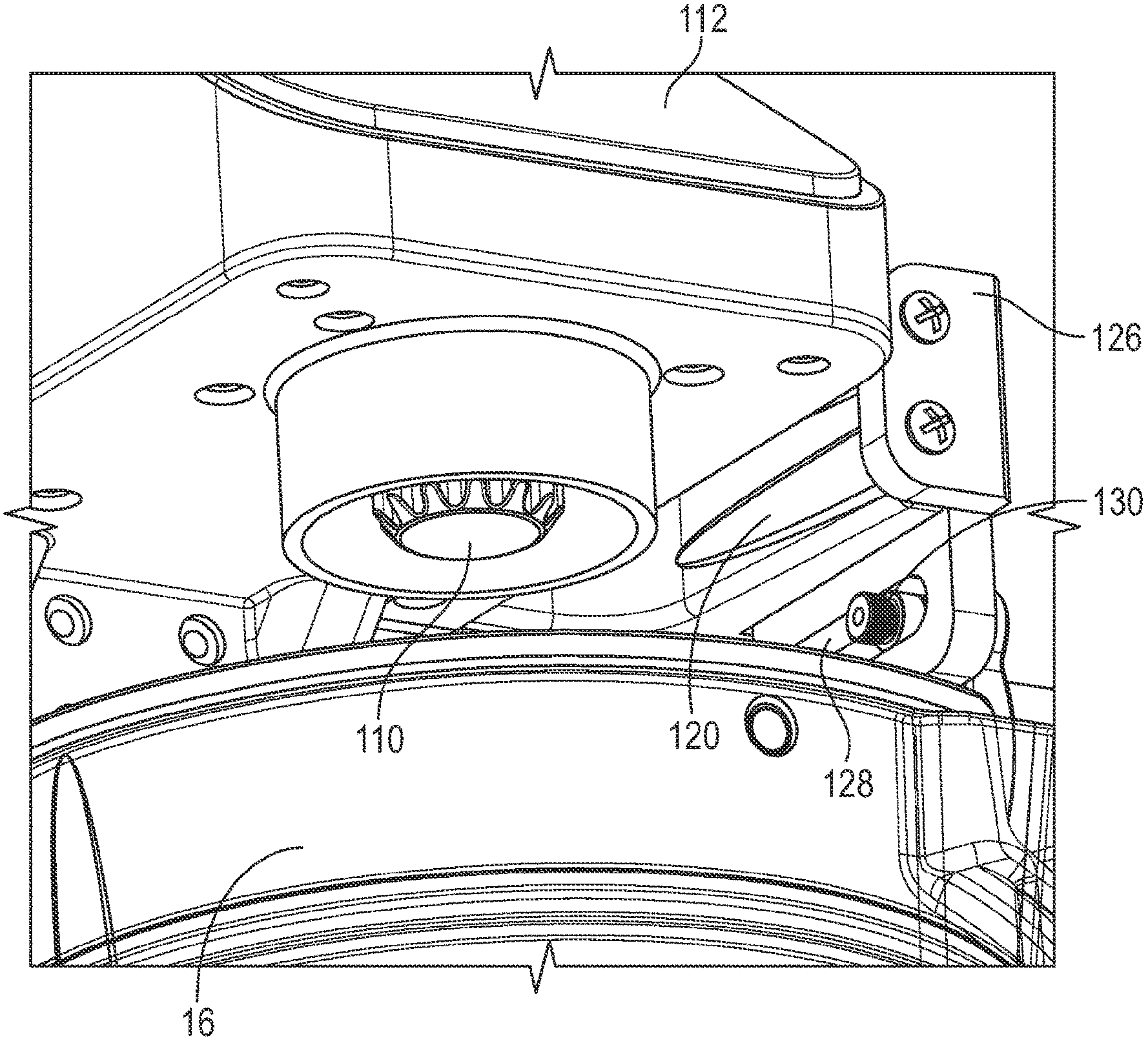
FIG. 9 is enlarged, bottom, perspective view of the motor mount of the food processing system of FIG. 1.
Figure 10:
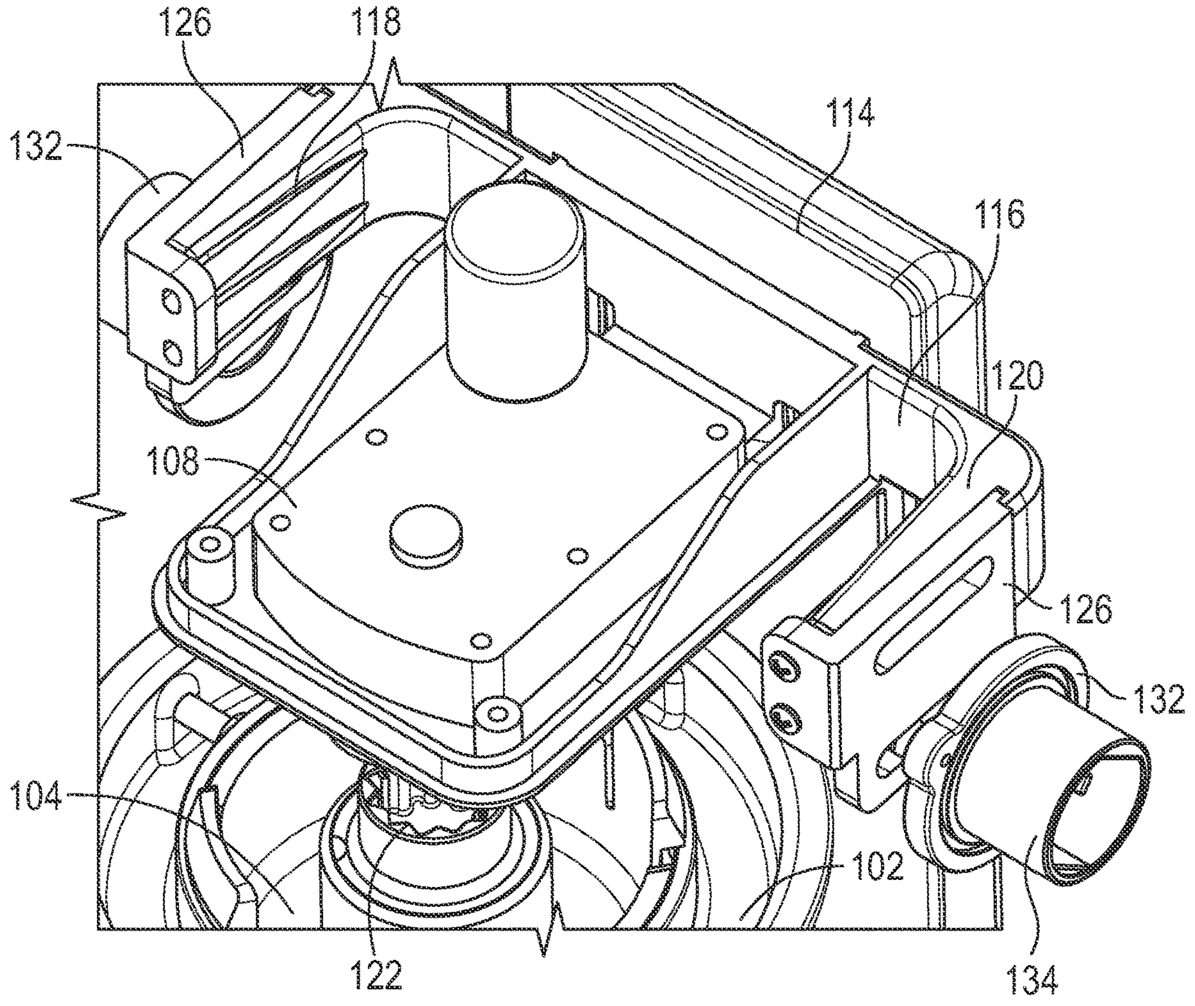
FIG. 10 is another enlarged, perspective view of the motor mount of the food processing system of FIG. 1.
Figure 11:
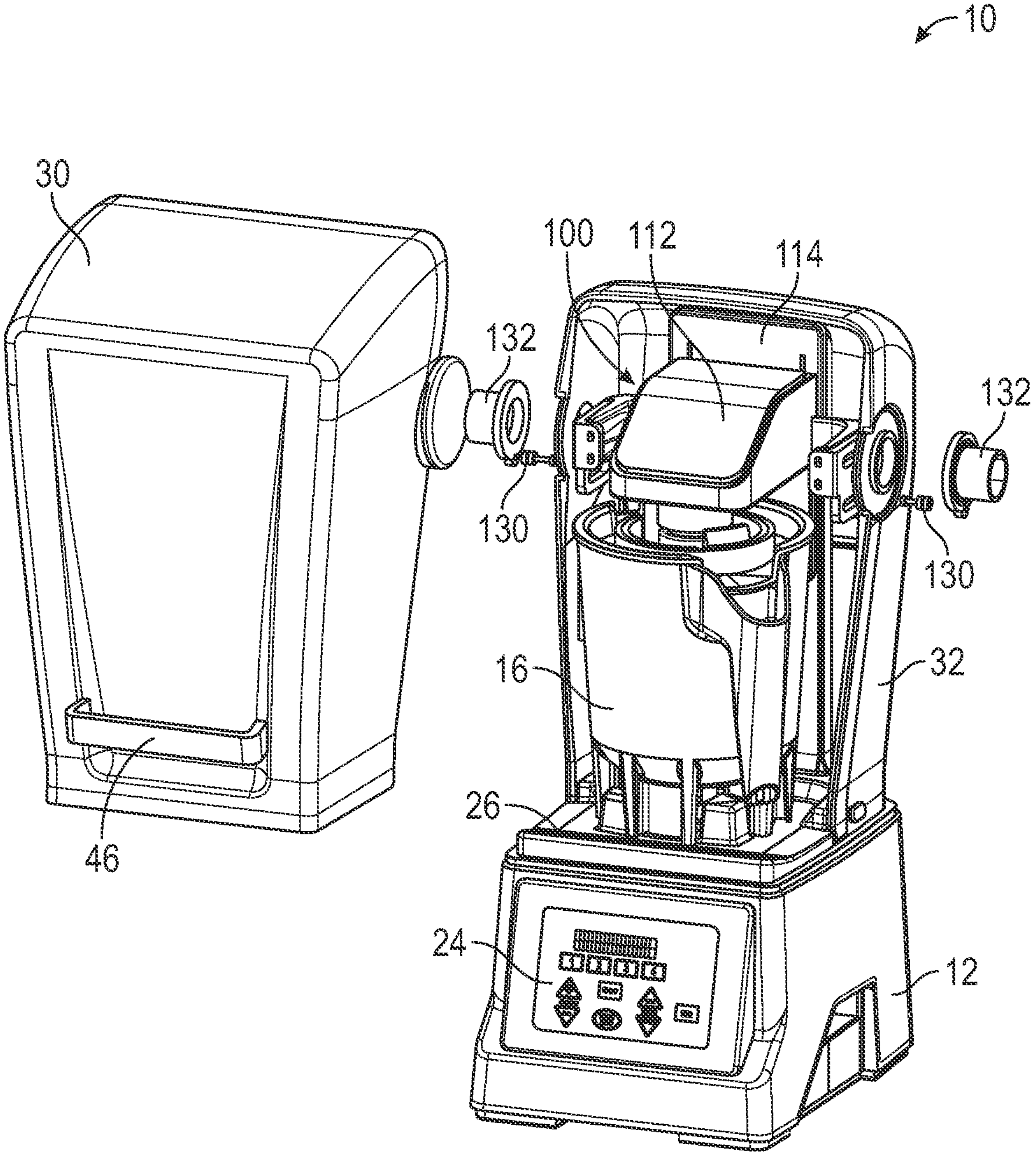
FIG. 11 is an exploded, perspective view of the food processing system of FIG. 1.
Figure 12:
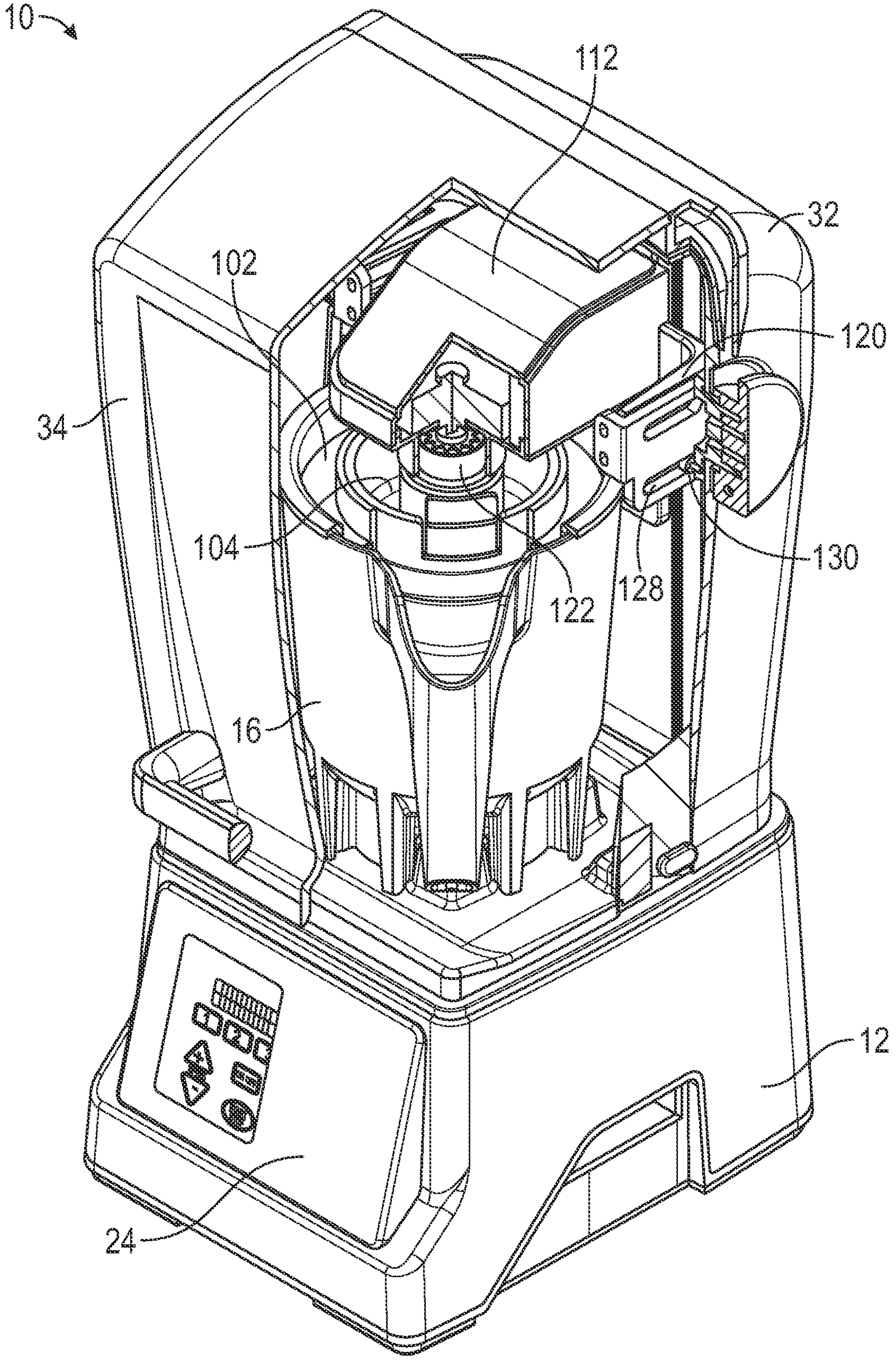
FIG. 12 is a partial cross-sectional, perspective view of the food processing system of FIG. 1, illustrating the sound enclosure in the closed position.
Figure 13:
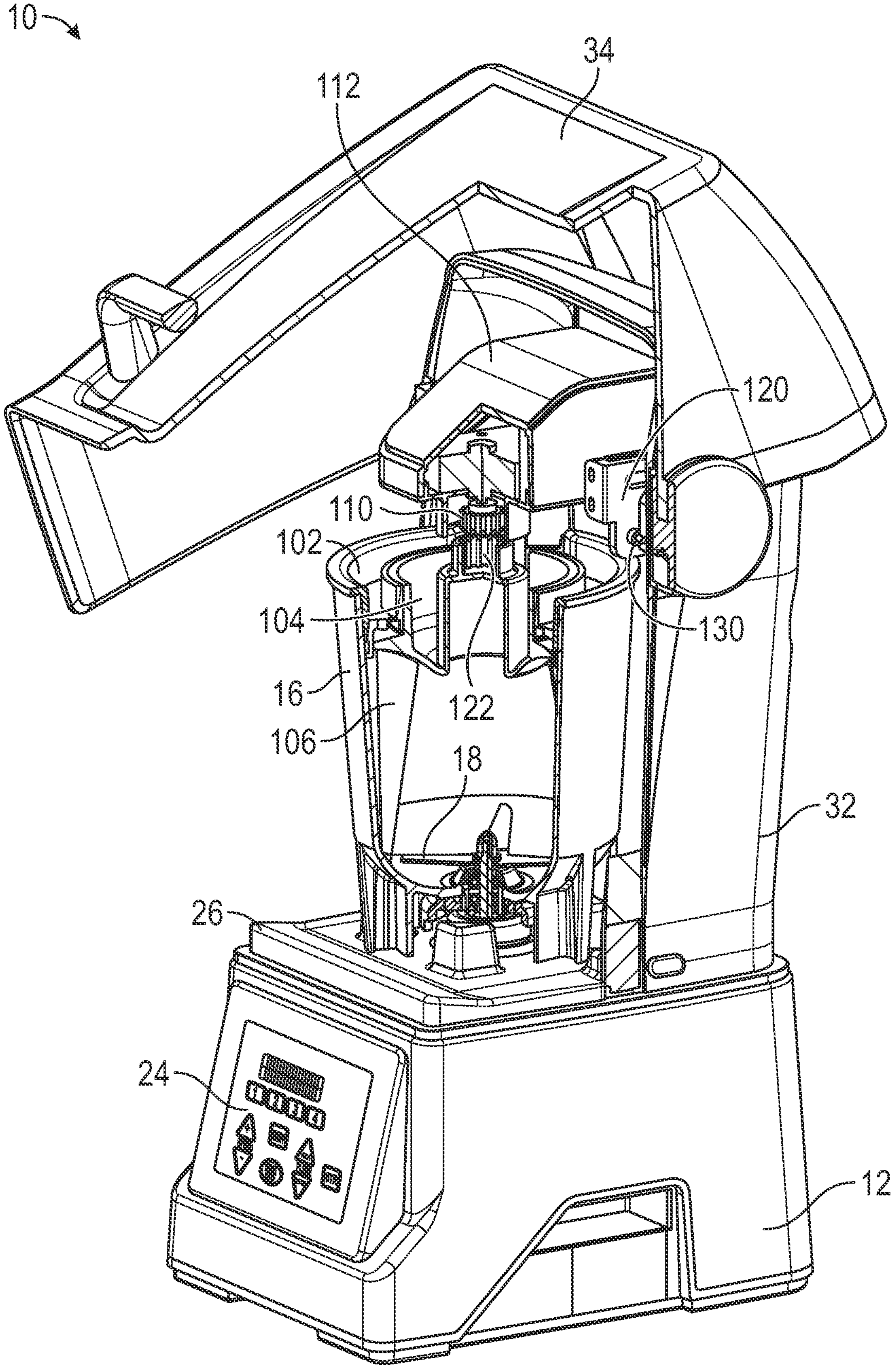
FIG. 13 is a partial cross-sectional, perspective view of the food processing system of FIG. 1, illustrating the sound enclosure in the open position.
Figure 14:
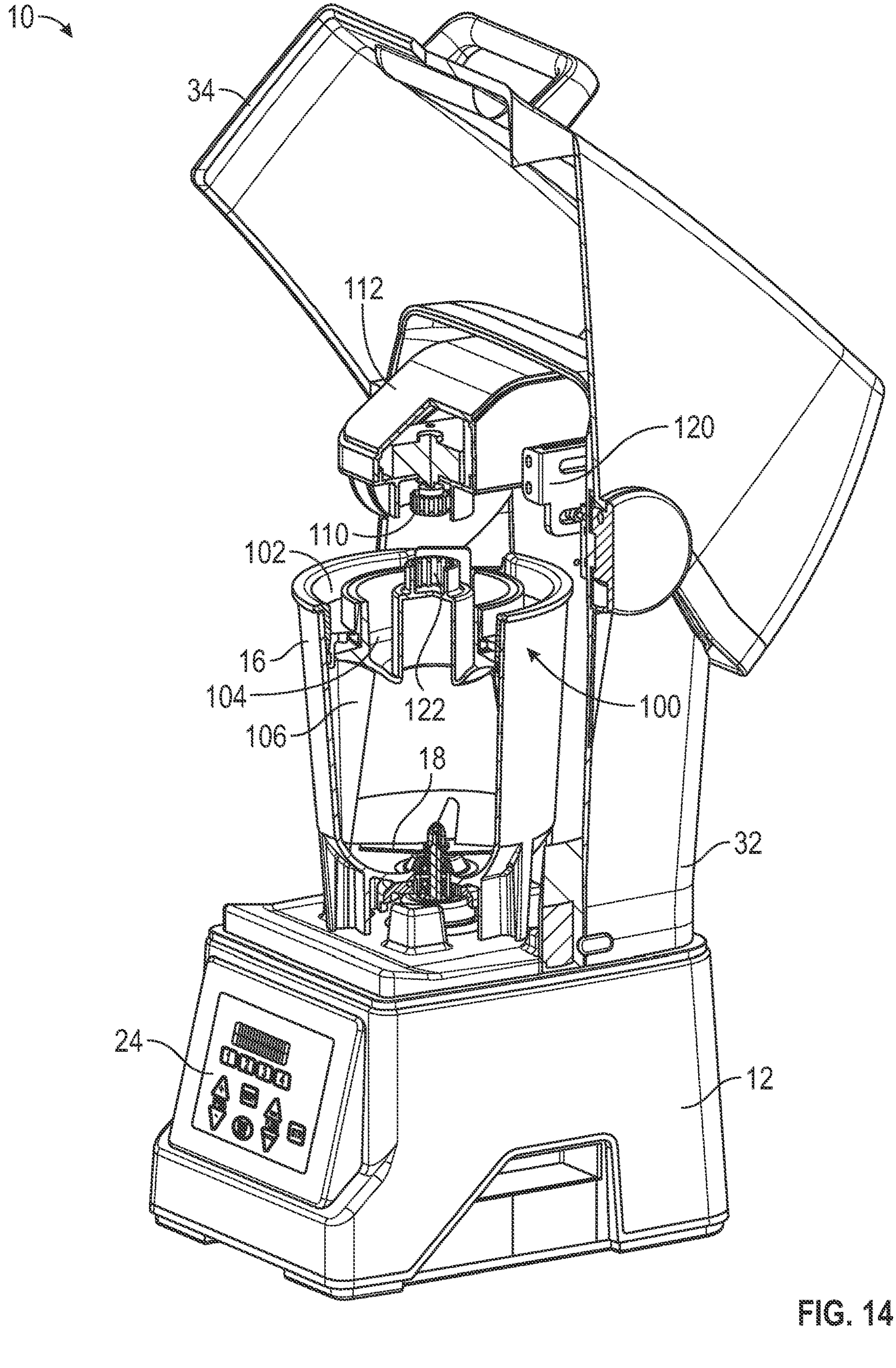
FIG. 14 is another partial cross-sectional, perspective view of the food processing system of FIG. 1, illustrating the sound enclosure in the open position.

In an embodiment, the distal end of the output shaft 110 and/or the hub 122 may be configured with one or more self-aligning features to facilitate smooth and reliable connection between the output shaft 110 and the hub 122 when the motor 108 is in the lowered position. For example, in an embodiment, the distal end of the output shaft 110 may have a taper, as shown in FIG. 9.

Moreover, it is contemplated that the motor 108 of the dasher assembly 100 may be operable using control panel 24 (via wired or wireless communication between the control panel 24 and the motor 108). In other embodiments, the food processing device 10 may be configured such that the motor 108 is automatically activated when the output shaft 110 is engaged with the hub 122 of the dasher 104. For example, the food processing device 10 may have a sensor for detecting when the front enclosure member 34 is in the closed position, as disclosed in U.S. Patent Application Publication No. 2022/0142410. Alternatively, the vertical support member 114 may have a sensor for detecting the position of the motor housing 112 and/or mounting bracket 116. Still further, while it is disclosed that the support member 114 is connected to base 12, in an embodiment, the support member 114 may be connected to the rear enclosure member 32 of the sound enclosure 30 (such that it may be removable from the base 12 along with the sound enclosure 30).

The present invention thus provides a means for easily, and automatically, engaging a drive hub 122 of a top-mounted dasher assembly 104 with the output shaft 110 of the dasher motor 108 when the sound enclosure 30 of the food processing system is moved to the closed position, and for easily, and automatically, disengaging output shaft 110 from the dasher drive hub 122 when the sound enclosure 30 of the food processing system is moved to the open position. Accordingly, engagement, and in some embodiment, even action actuation, of the dasher assembly can occur automatically upon moving the front enclosure member 34 to the closed position. Moreover, by automatically raising the dasher motor 108 and output shaft 110 above and out of engagement with the processing container 16 when the front enclosure member 34 is opened, the processing container 16 can be removed from the base 12 without any additional user operations or manipulation of the motor housing 112. As a result, and ease of use and level of user convenience heretofore not seen in the art may be realized.

While the present invention discloses a moveable motor housing that can be raised lowered so as bring the output shaft of the dasher motor into engagement with a drive hub 1 of a dasher assembly, the present invention is not intended to be so limited in this regard. In particular, it is contemplated that the motor housing 112, motor 108 and output shaft 110 may be in fixed position, and the processing container 16 may be raised or lifted to bring the drive hub 122 into engagement with the output shaft 110 of the dasher motor 108.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processing system, comprising:

a processing container having a motor-driven processing blade positioned at a bottom of the processing container;

a lid receivable atop the processing container;

a motor-driven dasher assembly connected to the lid and being configured to scrape interior sidewalls of the processing container, the motor-driven dasher assembly having a hub; and a motor having an output shaft located outside the processing container, at least the output shaft being moveable, while the lid is received atop the processing container, between a raised position where the output shaft is vertically spaced from the hub of the motor-driven dasher assembly, and a lowered position where the output shaft is engaged with the hub.

2. A food processing system, comprising:

a processing container having a motor-driven processing blade positioned at a bottom of the processing container;

a lid receivable atop the processing container;

a motor-driven dasher assembly connected to the lid and being configured to scrape interior sidewalls of the processing container, the motor-driven dasher assembly having a hub;

a motor having an output shaft, at least the output shaft being moveable between a raised position where the output shaft is vertically spaced from the hub of the motor-driven dasher assembly, and a lowered position where the output shaft is engaged with the hub;

a sound enclosure, the sound enclosure being moveable between a closed position and an open position;

wherein movement of the sound enclosure from the closed position to the open position causes a corresponding movement of the output shaft from the lowered position to the raised position.

3. A food processing system, comprising:

a processing container having a motor-driven processing blade positioned at a bottom of the processing container;

a lid receivable atop the processing container;

a motor-driven dasher assembly connected to the lid and being configured to scrape interior sidewalls of the processing container, the motor-driven dasher assembly having a hub;

a motor having an output shaft, at least the output shaft being moveable between a raised position where the output shaft is vertically spaced from the hub of the motor-driven dasher assembly, and a lowered position where the output shaft is engaged with the hub;

a base configured to support the processing container; and a support member extending from the base;

wherein the motor is operatively connected to the support member for linear movement along the support member.

4. The food processing system of claim 3, wherein:

the output shaft includes a taper configured to facilitate engagement of the output shaft with the hub when the motor is moved to the lowered position.

5. The food processing system of claim 2, wherein:

the output shaft is moveable in a vertical direction along a rotational axis of the motor-driven dasher assembly.

6. The food processing system of claim 2, wherein:

movement of the sound enclosure from the open position to the closed position causes a corresponding movement of the output shaft from the raised position to the lowered position.

7. The food processing system of claim 2, wherein:

the sound enclosure includes a rear cover member and a front cover member pivotally connected to the rear cover member at a pivot axis.

8. The food processing system of claim 7, further comprising:

at least one lift driver connected to the front cover member and extending inwardly therefrom, the at least one lift driver and the front cover member being configured for rotation about the pivot axis;

wherein the lift driver includes a pin offset from the pivot axis, the pin being received in a corresponding slot in a bracket that supports the motor.

9. The food processing device of claim 8, wherein:

the pin is a roller bearing.

10. The food processing system of claim 8, wherein:

when the front cover member is pivoted about the pivot axis to move the sound enclosure to the open position, the pin revolves around the pivot axis and exerts an upward biasing force on the bracket which effects a corresponding upward movement of the motor to the raised position.

11. The food processing system of claim 10, further comprising:

a base configured to support the processing container; and a support member extending from the base;

wherein the motor is operatively connected to the support member for linear movement along the support member.

12. The food processing system of claim 2, wherein:

the motor is configured to rotate the dasher assembly automatically when the sound enclosure is in the closed position.

13. A method for food processing, comprising the steps of:

coupling a dasher assembly to a processing container such that a scraper blade of the dasher assembly is disposed within the processing container;

positioning the processing container on a base of a food processor so as to engage a blade hub of the processing container with a rotatable output shaft of a motor housed in the base;

lowering a dasher motor to drivingly connect an output shaft of the dasher motor with a drive hub of the dasher assembly; and actuating the dasher motor to rotate the scraper blade within the processing container;

wherein the step of lowering the dasher motor is carried out automatically by closing a front cover member of a sound enclosure to enclose the processing container.

14. The method according to claim 13, wherein:

the step of actuating the dasher motor to rotate the scraper blade is carried out automatically by a control unit upon closing the front cover member.

15. The method according to claim 14, further comprising the step of:

opening the front cover member to access the processing container;

wherein opening the front cover member effects raising of the dasher motor and decoupling of the output shaft of the dasher motor from the drive hub of the dasher assembly.

16. A food processing system, comprising:

a base having a motor;

a support member extending from the base;

a processing container having a motor-driven processing blade positioned at a bottom of the processing container and engageable with an output shaft of the motor in the base;

a lid receivable atop the processing container;

a dasher assembly connected to the lid and having at least one scraper blade disposed in the processing container and being configured to scrape interior sidewalls of the processing container; and a dasher motor positioned above the processing container, the dasher motor having an output shaft that is selectively engageable with the dasher assembly, the dasher motor being configured to rotate the at least one scraper blade upon actuation of the dasher motor;

wherein the output shaft of the dasher motor is moveable between a raised position where the output shaft is vertically spaced from the dasher assembly, and a lowered position where the output shaft is engaged with the dasher assembly;

wherein the dasher motor is operatively connected to the support member for linear movement along the support member.

17. The food processing system of claim 16, further comprising:

a sound enclosure, the sound enclosure being moveable between a closed position and an open position;

wherein movement of the sound enclosure from the closed position to the open position causes a corresponding movement of the output shaft from the lowered position to the raised position.

* * * * *